(12) United States Patent
Hartig et al.

(10) Patent No.: US 7,105,056 B2
(45) Date of Patent: Sep. 12, 2006

(54) PNEUMATIC HANDLING AND RECOATING APPARATUS AND METHOD OF USE

(75) Inventors: Klaus Hartig, Avcoa, WI (US); David Stebbins, Spring Green, WI (US)

(73) Assignee: Cardinal CG Company, Eden Prairie, MN (US)

( * ) Notice: Subject to any disclaimer, the term of this patent is extended or adjusted under 35 U.S.C. 154(b) by 93 days.

(21) Appl. No.: 10/334,054

(22) Filed: Dec. 30, 2002

(65) Prior Publication Data

US 2004/0126495 A1    Jul. 1, 2004

(51) Int. Cl.
   *B05C 19/04*    (2006.01)
(52) U.S. Cl. .................. 118/50; 118/500; 118/503; 269/21; 294/64.1; 294/64.3
(58) Field of Classification Search ................. 118/50, 118/500, 503; 269/21, 22; 264/267; 271/90; 294/64.1, 64.3; 901/40; 425/395, 389; 156/105, 156/285
See application file for complete search history.

(56) References Cited

U.S. PATENT DOCUMENTS

| | | | |
|---|---|---|---|
| 3,833,230 A | 9/1974 | Noll | |
| 3,875,373 A | 4/1975 | Lowery et al. | |
| 4,006,929 A | 2/1977 | Barker | |
| 4,009,785 A | 3/1977 | Trayes | |
| 4,129,328 A | 12/1978 | Littell | |
| 4,200,420 A | 4/1980 | Cathers et al. | |
| 4,228,993 A | 10/1980 | Cathers | |
| 4,280,861 A * | 7/1981 | Schwartz | 156/382 |
| 4,460,208 A | 7/1984 | Hoffman | |
| 4,600,229 A | 7/1986 | Oten | |
| 4,735,449 A | 4/1988 | Kuma | |
| 4,806,070 A | 2/1989 | Poux et al. | |
| 4,852,926 A | 8/1989 | Littell | |
| 4,904,012 A | 2/1990 | Nishiguchi et al. | |
| 5,069,836 A * | 12/1991 | Werner et al. | 264/36.21 |
| 5,172,949 A | 12/1992 | Nagai et al. | |
| 5,192,070 A | 3/1993 | Nagai et al. | |
| 5,193,796 A | 3/1993 | Nagai et al. | |
| 5,213,385 A | 5/1993 | Nagai et al. | |
| 5,260,098 A * | 11/1993 | Trentesaux et al. | 427/347 |
| 5,378,150 A * | 1/1995 | Harrel | 433/91 |
| 5,451,345 A * | 9/1995 | Hatton et al. | 427/515 |
| 5,792,480 A * | 8/1998 | Thomas | 425/12 |
| 5,814,173 A * | 9/1998 | Stone | 156/71 |
| 6,032,997 A | 3/2000 | Elliott et al. | |
| 6,315,565 B1 * | 11/2001 | Slotke et al. | 433/216 |
| 6,452,117 B1 * | 9/2002 | Curcio et al. | 174/262 |

* cited by examiner

*Primary Examiner*—Laura Edwards
(74) *Attorney, Agent, or Firm*—Fredrikson & Byron, PA

(57) ABSTRACT

A pneumatic handling and recoating apparatus for handling workpieces, such as glass, is provided. The apparatus utilizes a holding device operatively connected to a vacuum assembly. The holding device engages workpieces by vacuum and subsequently releases them by a burst of gas. The burst of gas also facilitates the application of a coating material, such as a stain-retardant agent, to a workpiece upon release from the holding device.

12 Claims, 7 Drawing Sheets

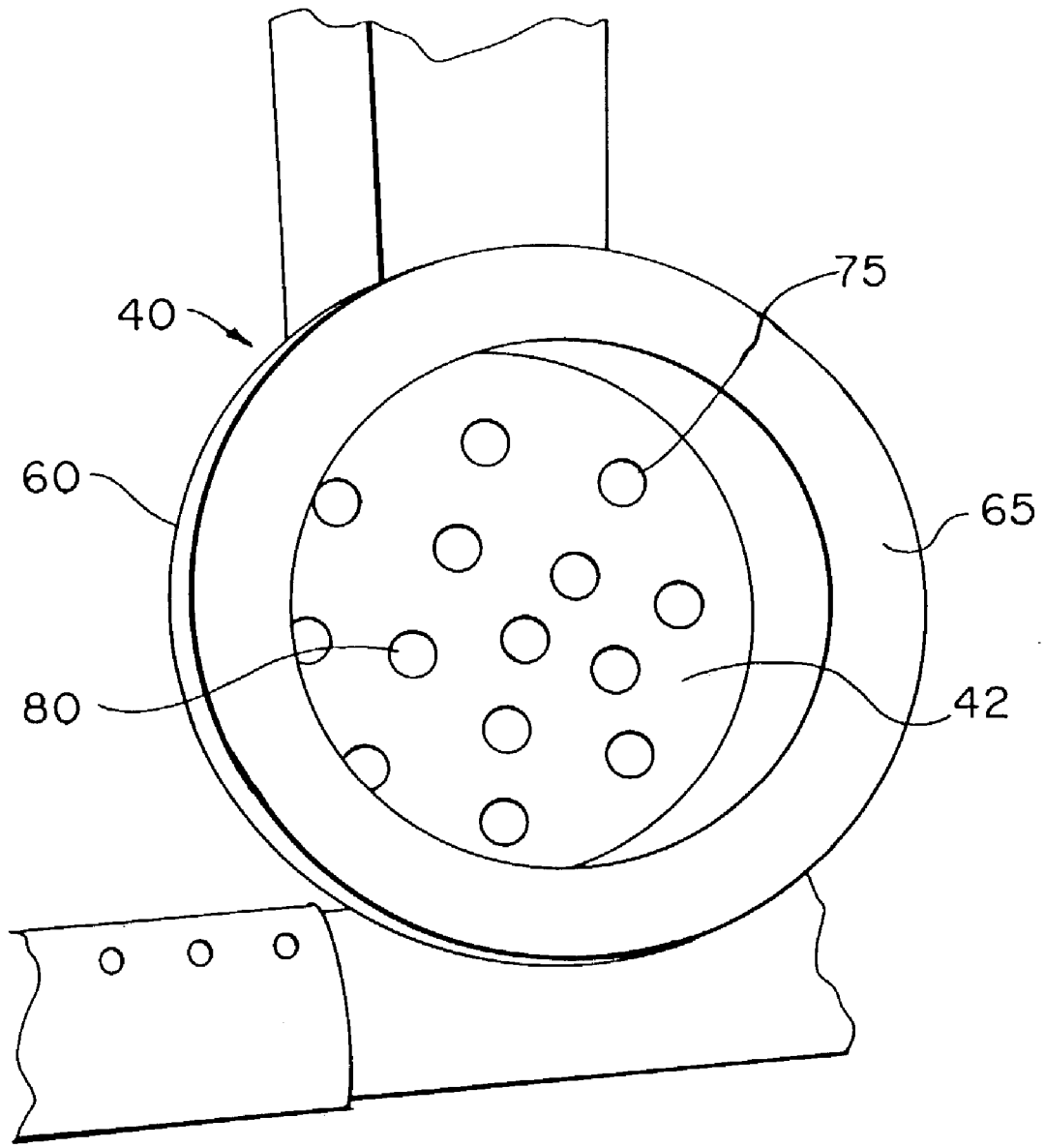

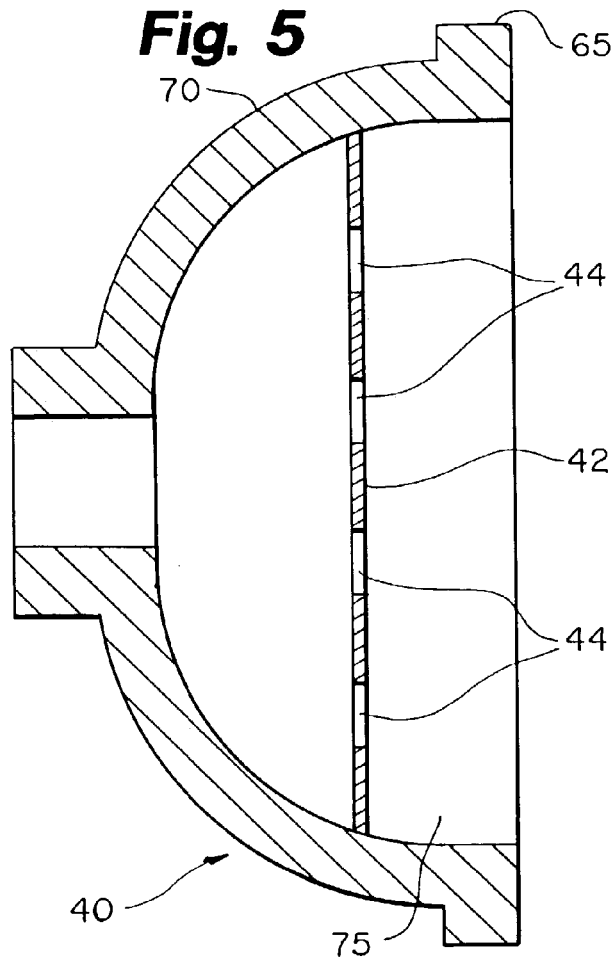
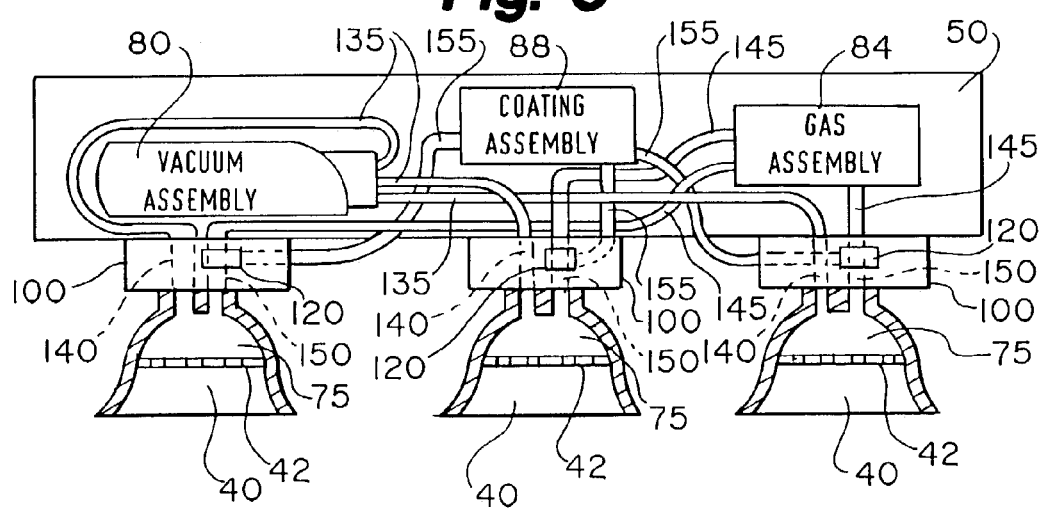

PNEUMATIC HANDLING AND RECOATING APPARATUS AND METHOD OF USE

FIELD OF THE INVENTION

The present invention provides an apparatus for lifting and handling objects, such as glass, by utilizing a holding device operatively connected to a vacuum source. More specifically, the invention provides a holding device that engages objects by vacuum and subsequently releases them by a burst of gas that includes one or more protective materials that adhere to the surface of the object.

BACKGROUND OF THE INVENTION

It is a conventional feature of automatic machines for moving materials, particularly sheet-like materials, that the material is handled using suction devices connected to air lines of a pneumatic system. Systems of this nature, for example, are commonly used in moving glass sheets. In such operations, suction cups are typically connected to vacuum pumps and invested with translatory motion such that they can be made to approach and grip the outermost sheet of a stack. The outermost sheet, which may be at the top, bottom, front, or back of a stack, is then separated from the stack and translated toward the final destination by a distancing movement of the suction cups.

When the suction cups are to be detached from the sheet to allow further processing, the connection with the vacuum pumps is terminated, and the cups are vented to the atmosphere. Alternatively, the connection with the vacuum pumps can be terminated, and the cups subjected to a burst of compressed gas. The connections in question are controlled in most instances by means of pneumatically actuated valves, which are incorporated into the delivery system. For example, the use of three-way valves is conventional in this field.

In practice, these suction cups can leave traces of contact on the surface of a workpiece, which is typically a rigid sheet of material. For example, upon release of a suction device, suction cup shaped markings can be left on the handled surface. The suction device can also remove powders and/or other coatings that have been applied to the workpiece. Sheets of glass, for example, are often treated with protective powders (or "separators"), as discussed below. Removal of these powders by the suction device can have adverse effects on the glass. For example, the surface of the glass from which the powder is removed will subsequently be vulnerable to soiling, staining, and corrosion by water and/or other materials.

It is noted that moisture corrosion roughens the surface of glass. In fact, the longer water sits on a glass surface, the more the surface is typically affected. For example, as water sits on glass, alkali components are leached from the glass, thereby changing the pH of the water to alkaline. Thus, when water is allowed to remain on unprotected glass for a significant period of time, it tends to remove elements from the glass, particularly sodium ions. This process leaves a mark on the glass that, in some cases, can be so objectionable as to render the glass unsaleable.

As noted above, glass is typically treated with stain-retardants that prevent or minimize damage from moisture corrosion. For example, acidic buffers, such as adipic acid and maleic acid, are commonly sprayed onto the glass. These buffers are sometimes mixed into a powder which, as noted above, is generally referred to as a "separator". The separator also provides protection during storage and transportation against abrasion between adjacent glass sheets in a stack.

As noted above, conventional pneumatic handling devices tend to remove some of the protective material from glass sheets during handling. For example, when glass is engaged by a pneumatic handling device, each suction cup acts somewhat like a vacuum cleaner. In effect, the protective material is vacuumed from the surface of the glass. Further, to effect disengagement of the suction cup from the glass, a short blast of pressurized air is sometimes applied. This blast of air can carry away even more of the protective powder. Finally, the portions of the suction cup that contact the glass tend to carry away protective material from the glass surface.

Often, it may not be immediately apparent that the protective powder has been displaced. In fact, suction cup marks may only appear after extended periods of storage. While these marks can be made visible by fogging the glass with steam, this procedure is so time-consuming as to be economically unfeasible. Even if no suction cup marks appear following storage, these marks may show up once the glass has been coated. To make matters worse, some suction cup marks only appear after the coated glass has been tempered. Of course, suction cup marks decrease the quality and value of glass. Moreover, depending on the severity of the marks, such damaged glass may be rejected in the marketplace.

It would be desirable to provide material handing devices and methods, particularly for glass sheets, which facilitate handling workpieces coated with protective material (e.g., powder) without removing such material during handling or replacing material upon release.

SUMMARY OF THE INVENTION

The present invention reduces the likelihood of corrosion and attendant marking caused by the handling and/or movement of a workpiece, by utilizing pneumatic holding devices that coat or recoat the surface of the workpiece that was contacted by the devices with a protective material. Accordingly, embodiments of the present invention provide a holding device that utilizes a vacuum system, which may temporarily remove the protective material during pneumatic holding, but subsequently replaces the protective material when the holding device is detached. Furthermore, embodiments of the present invention utilize a burst or blast of gas including a protective material, such as stain-retardant powder, to recoat the surface of a glass sheet upon detachment of the holding device from the glass. Thus, the adverse effects that can result from removal of such protective materials can be minimized by the reapplication of such material during the release procedure.

BRIEF DESCRIPTION OF THE DRAWINGS

FIG. 4 is a frontal perspective view of a holding device of a pneumatic handling and recoating apparatus;

FIG. 5 is a sectional view of a holding device in accordance with one embodiment of the present invention;

FIG. 6 is a top partially sectional view of a pneumatic handling and recoating apparatus that includes a holding device, a coating device, and vacuum and gas assemblies in accordance with another embodiment of the invention;

DETAILED DESCRIPTION OF THE INVENTION

Figure 1:
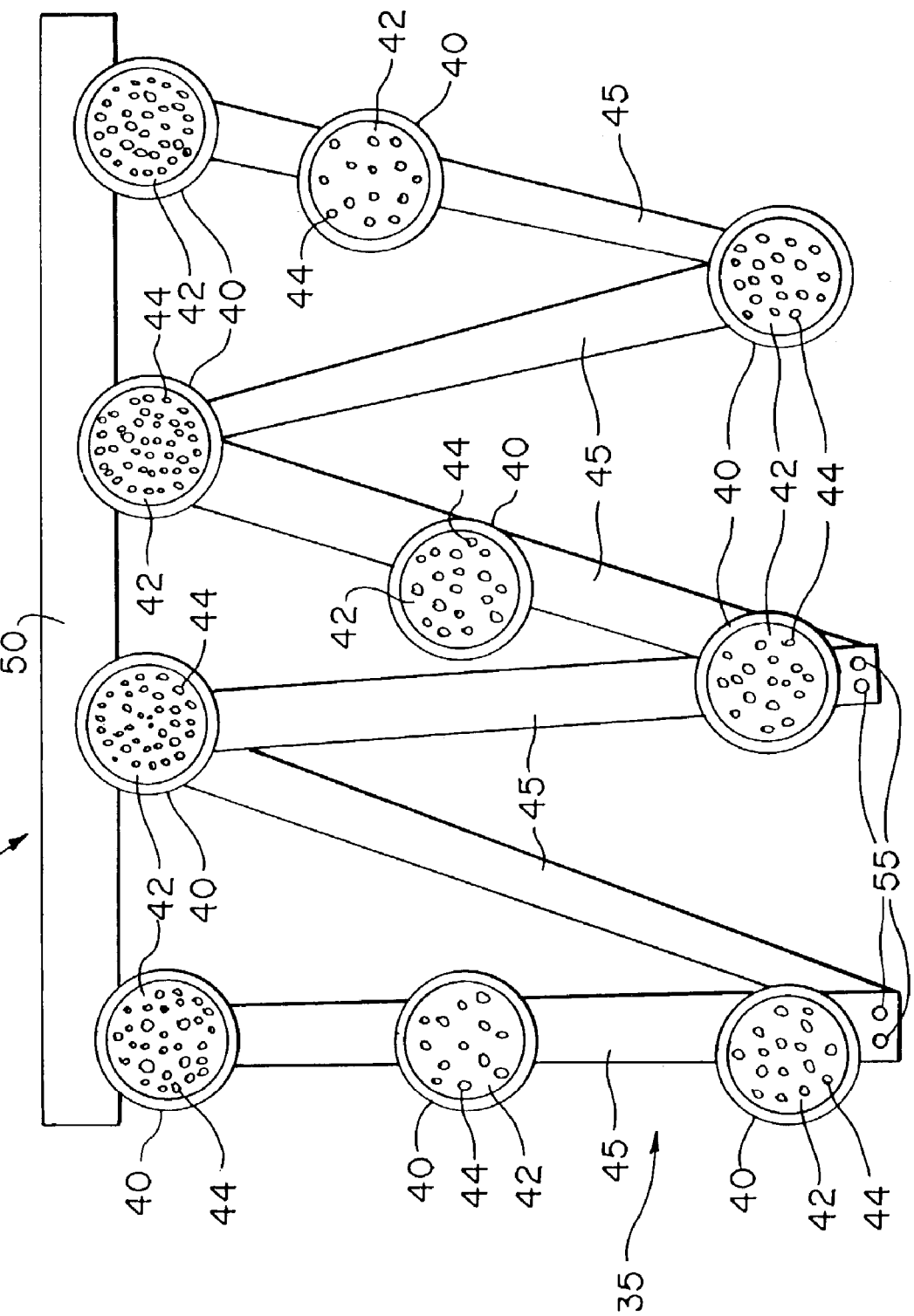
FIG. 1 is a schematic drawing depicting a pneumatic handling and recoating apparatus in accordance with one embodiment of the present invention.

Referring now to the drawings, depicted in FIG. 1 is an embodiment of a pneumatic handling and recoating apparatus 10 of the present invention for handling workpieces. The apparatus 10 is particularly useful for handling sheet-like workpieces (e.g., sheets of glass, metal, plastic, or any other types of panels, such as automotive panels). The illustrated pneumatic handling and recoating apparatus 10 generally includes a base frame 35 and a plurality of holding devices 40. In this embodiment of the present invention, the base frame 35 is constructed of a plurality of retention beams (or "rods") 45, each adjoined to a main beam 50. Each retention beam 45 is coupled to an adjacent retention beam 45 by one or more connectors 55 (e.g., bolts, hinges, rivets, welds, etc.). Each of the illustrated retention beams 45 are connected to the main beam 50. FIG. 1 also depicts holding devices 40 including optional spray grids 42 with their associated spray apertures 44. Such holding devices 40 are described below in more detail.

Figure 2:
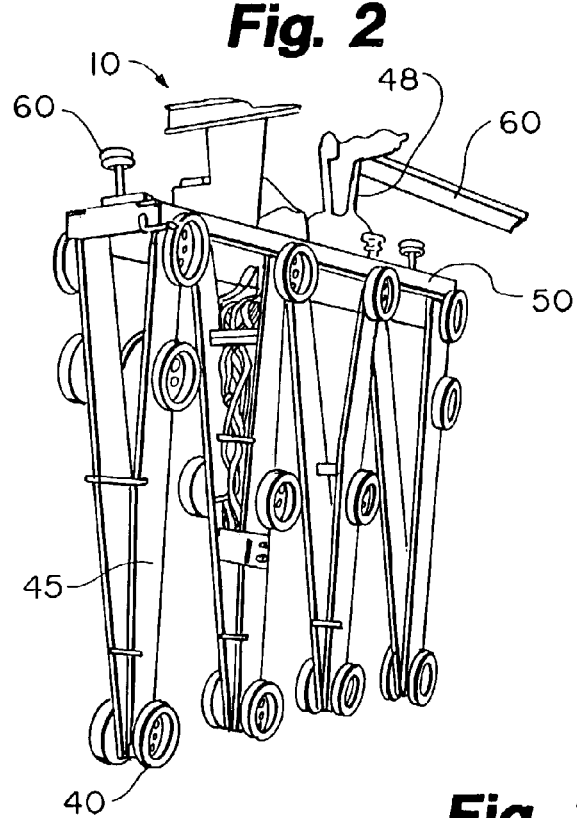
FIG. 2 is a perspective view of a pneumatic handling and recoating apparatus which includes a holding device, vacuum assembly, and gas assembly.

The main beam 50 can be provided with a movement system 48 as depicted in FIG. 2, including a track or rail system 60, which facilitates movement of the entire apparatus 10 as well as movement the retention beams 45 selectively closer to, or further away from, one another. Movement of the retention beams 45 allows the holding devices 40 to be positioned to accommodate objects of various sizes and shapes. In embodiments that facilitate such movement, the connectors 55 are desirably adapted to permit pivoting. Preferably, the movement system also facilitates moving the entire base frame 35 from place to place (e.g., along the track or rail). Other mechanisms known in the art can be incorporated to facilitate movement of the base frame 35 and/or movement of the beams 45 relative to one another. For example, various hydraulic or electrical assemblies can be utilized to facilitate such movement.

Figure 3:
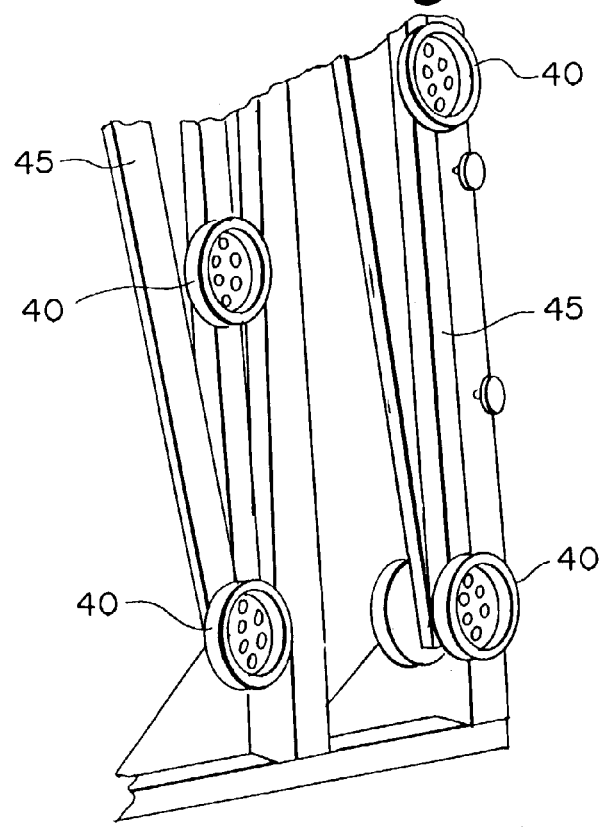
FIG. 3 is a perspective view of a pneumatic handling and recoating apparatus which includes a holding device, vacuum assembly, and gas assembly.

The retention beams 45 and main beam 50 can be formed of any material suitable for supporting the weight of the desired objects to be handled. For example, suitable materials include metals, alloys, fiberglass, rigid plastics, and any other materials used conventionally for structures of this nature. The holding devices 40 can be positioned upon the retention beams 45 at any desired locations. Preferably, holding devices 40 are generally uniformly spaced (as shown in FIG. 1) to provide optimum engagement with sheet-like workpieces. FIGS. 2–4 illustrate the spacing of suction cups on conventional pneumatic handling apparatuses. The holding devices 40 of the present invention can be spaced about the base frame 35 in much the same arrangement.

FIGS. 4 and 5 illustrate a preferred holding device 40 of the present invention. The holding device 40 (or "suction device") includes a rim 65, a bellows 70, a cavity 75, and an optional spray grid 42. The rim 65 is preferably formed of an elastomer material that is adapted to provide a good seal between the holding device 40 and the surface of a workpiece (not shown). A flexible material is preferred, such as rubber or neoprene. A bellows 70 expands from the rim 65 of the holding device 40. The bellows 70 is advantageously formed of a flexible material that permits contraction and expansion thereof according to the gas pressure within. The bellows 70 and inner walls of the rim 65 define boundaries of the cavity 75. Finally, each holding device 40 optionally includes a spray grid 42, located within the cavity 75. If present, the spray grid 42 assists in dispersing coating onto the surface of a workpiece through the spray apertures 44. It is noted that each holding device 40 of the invention can be provided in the form of a cup or pad in any desired size or shape.

With reference to the embodiment typified in FIG. 6, each holding device 40 can be operably connected, in a selective manner, to a vacuum assembly 80, gas assembly 84, and coating assembly 88. In one embodiment of the present invention, the vacuum assembly 80, gas assembly 84, and coating assembly 88 can each be mounted, or located adjacent, to the main beam 50. The vacuum assembly 80 is advantageously provided with a vacuum generator (not shown) operably connected to vacuum conduits 135, such as vacuum hoses, which preferably lead in parallel to each of the holding devices 40. If so desired, a single vacuum conduit 135 can alternatively be routed in series to each of the holding devices 40. With continued reference to FIG. 6, each vacuum conduit 135 is adjoined, via a connection housing 100 on one of the holding devices 40, to a vacuum channel 140 opening into the cavity 75 of that holding device 40. Thus, when the holding devices are engaged with a workpiece (not shown), the vacuum generator can be operated to draw a vacuum in the cavity 75 of each holding device 40, thereby sealingly attaching the holding devices 40 to the workpiece.

The pneumatic assembly 10 embodiment of FIG. 6 is provided with a vacuum assembly 80 that is separate from the gas assembly 84. The gas assembly 84 is advantageously provided with a gas compressor (not shown) operably connected to gas conduits 145, such as gas hoses, which preferably lead in parallel to each of the holding devices 40. If so desired, a single gas conduit 145 can alternatively be routed in series to each of the holding devices 40. With continued reference to FIG. 6, each gas conduit 145 is adjoined, via a connection housing 100 on one of the holding devices 40, to a gas channel 150 opening into the cavity 75 of that holding device 40. In more detail, each illustrated gas conduit 145 opens into a coating reservoir 120, from which extends a gas channel 150. As discussed below, the optional coating reservoirs 120 are adapted to receive coating material from the coating assembly 88 (via coating conduits 155).

If provided, the coating reservoir 120 (or "chamber") is preferably adapted to accommodate enough coating material to sufficiently coat or recoat the workpiece surface to which the holding device 40 is attached. The size of the chamber, of course, can be varied depending the amount of coating that is desirably applied to the workpiece. One or more reservoir valves (not shown) can be positioned within the coating reservoir 120 to control the injection, retention, and release of the coating. Such reservoir valves would allow entry of coating into the reservoir 120 at the desired time and also release coating from the reservoir 120 into the suction device 40 when desired. Reservoir valves can, of course, be utilized in this manner in any embodiment of the present invention.

The pneumatic assembly 10 also includes a coating assembly 88. Generally speaking, the coating assembly 88 is a containing and injection system for retaining a supply of coating and delivering coating material to the holding devices 40. The coating assembly 88 is advantageously provided with a coating injector (not shown) operably connected to coating conduits 155, such as coating hoses, which preferably lead in parallel to each of the holding devices 40. If so desired, a single coating conduit 155 can alternatively be routed in series to each of the holding devices 40. With continued reference to FIG. 6, each coating conduit 155 is adjoined, via a connection housing 100 on one of the holding devices 40, to a gas channel 150 opening into the cavity 75 of that holding device 40. In more detail, each illustrated coating conduit 155 opens into to a coating reservoir 120 from which extends a gas channel 150. If so desired, each coating conduit 155 can alternatively be adjoined at an intersection point to one of the gas conduits 145, such that the coating conduit 155 opens into the gas conduit 145 at such intersection point.

With continued reference to FIG. 6, when the holding devices 40 are engaged to a workpiece (not shown), the vacuum generator (or "vacuum source") can be utilized to create a vacuum in the cavity 75 of each holding device 40, thereby sealingly attaching the holding devices 40 to the workpiece. When it is desired to detach the holding devices 40 from the workpiece, the gas 84 and coating assemblies 88 can be operated to deliver coating material to the coating reservoirs 120 and to deliver a burst of gas through the gas lines 145 so as to expel the coating material from the coating reservoirs 120, through the gas channels 150, and onto the workpiece. It is noted that in various embodiments of the present invention a series of injection nozzles may be operably adjoined to the coating reservoir 120 and extending through the apertures 44 to deliver the burst of gas and coating material to the surface of the workpiece. Preferably, the coating assemblies 88 and gas assemblies 84, are operated in succession, although simultaneous operation is also envisioned. For example, the coating assembly 88 can be operated to deliver coating material to the gas conduits 145 or coating reservoirs 120 prior to detachment of the holding devices. Thereafter, the gas assembly 84 can be operated to deliver a burst of gas through the gas conduits 145, thereby detaching the holding devices 40 and expelling coating material from the gas channels 150 onto the workpiece.

Figure 7:
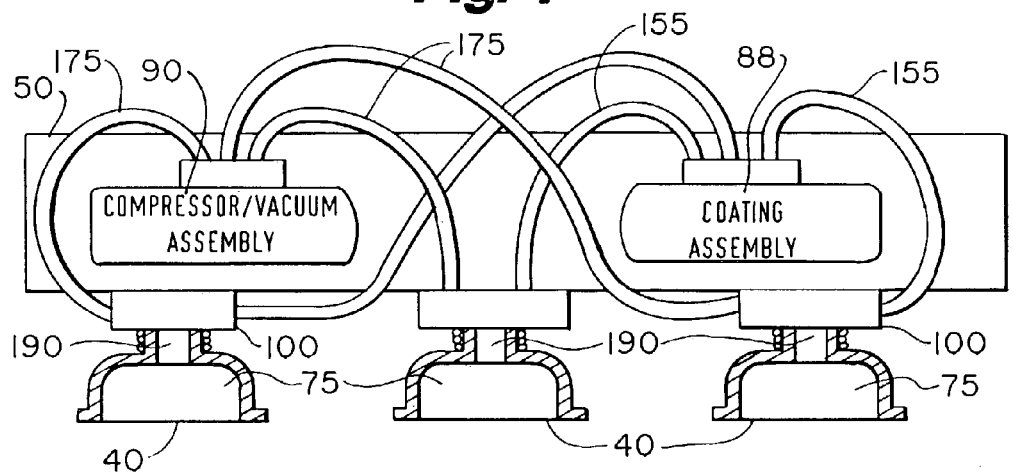
FIG. 7 is a top partially-sectional view of a pneumatic handling and recoating apparatus that includes a single unit vacuum/gas assembly, a coating assembly, and holding devices in accordance with still another embodiment of the invention.
Figure 8:
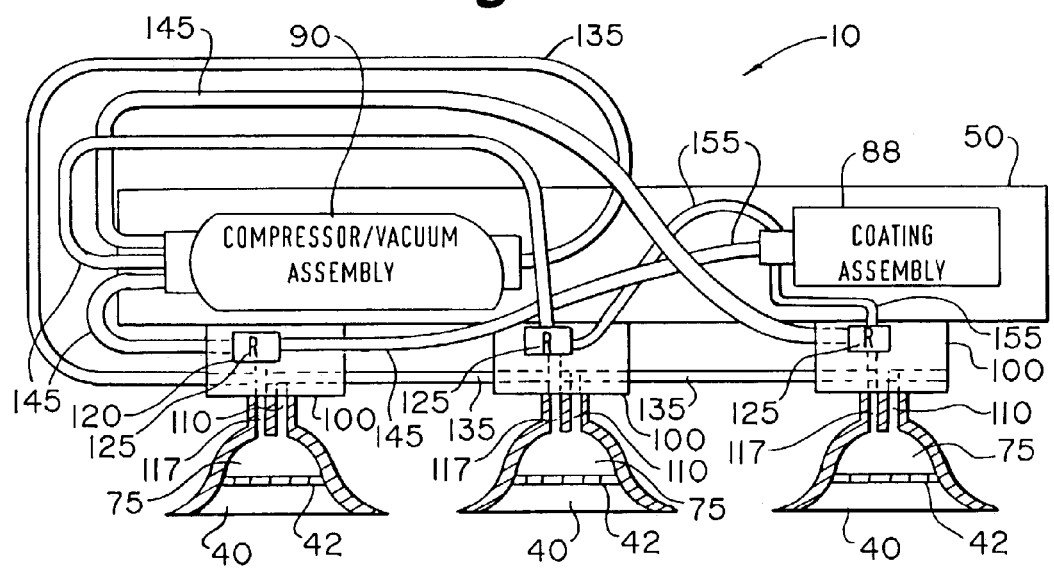
FIG. 8 is a top partially-sectional view of a pneumatic handling and recoating apparatus that includes a single unit vacuum/gas assembly, a coating assembly, and holding devices in accordance with yet another embodiment of the invention.

FIGS. 7 and 8 depict embodiments of the invention wherein a single unit provides emission of both gas and vacuum. As shown in FIGS. 7 and 8, an integrated compressor/vacuum assembly 90 can be mounted to the top of the main beam 50. Alternatively, an integrated compressor/vacuum assembly 90 can be positioned in an area surrounding the pneumatic handling and recoating apparatus 10. The mounting of this assembly 90 would, of course, be well within the purview of those skilled in the art.

With reference to FIG. 7, the compressor/vacuum assembly 90 advantageously includes a gas compressor (not shown) and a vacuum generator (not shown). In the illustrated embodiment, the compressor/vacuum assembly 90 is operably connected to multiple pneumatic conduits 175, which lead to each of the holding devices 40. If so desired, a single pneumatic conduit 175 can alternatively be routed in series to each of the holding devices 40. In the illustrated embodiment, each pneumatic conduit 175 is adjoined, via a connection housing 100 on one of the holding devices 40, to an outlet channel 190 opening into the cavity 75 of that holding device 40. In one embodiment, each pneumatic conduit 175 opens into a coating reservoir (not shown), from which extends an outlet channel 190. Likewise in this embodiment, a coating conduit 155 opens into each coating reservoir. In another embodiment, each coating conduit 155 is adjoined at an intersection point (not shown) to one of the pneumatic conduits 175, such that the coating conduit 155 opens into the pneumatic conduit 175 at such intersection point.

With continued reference to FIG. 7, each pneumatic conduit 175 is adapted to emit both gas and vacuum. Thus, when the holding devices 40 are engaged to a workpiece (not shown), the vacuum generator can be utilized to create a vacuum in the cavity 75 of each holding device 40. When it is desired to detach the holding devices 40 from the workpiece, the gas compressor and the coating assembly can be operated simultaneously to deliver coating material either to the intersection point of the pneumatic conduits 175 and coating conduits 155 or to the coating reservoirs 120, whichever the case may be, and to deliver a burst of gas through the pneumatic conduits 175. This expels the coating material through the outlet channels 190 and onto the workpiece. Alternatively, the coating assembly 88 and the compressor/vacuum assembly 90 can be operated in succession. For example, the coating assembly 88 can be operated to deliver coating material to the intersection points of the pneumatic conduits 175 and coating conduits 155 or to the coating reservoirs 120, as the case may be, prior to detachment of the holding devices 40. Thereafter, the gas compressors can be operated to deliver a burst of gas through the pneumatic conduits 175, thereby detaching the holding devices 40 and expelling the coating material from the outlet channels 190 onto the workpiece.

FIG. 8 illustrates another embodiment of the invention involving an integrated compressor/vacuum system 90 capable of simultaneously providing both vacuum and gas at pressure. As with the embodiment of FIG. 7, the compressor/vacuum assembly 90 advantageously includes a gas compressor (not shown) and a vacuum generator (not shown). In the embodiment of FIG. 8, the vacuum generator (or "vacuum source") within the integrated compressor/vacuum system 90 is operably connected to a single vacuum conduit 135 that is routed in series through each of the holding devices 40. If so desired, the vacuum generator can alternatively be operably connected to multiple vacuum conduits (not shown) leading in parallel to each of the holding devices 40. In the illustrated embodiment, the vacuum conduit 135 is in communication with a vacuum channel 110 in each of the holding devices 40. The vacuum channel 10 in each holding device 40 opens into the cavity 75 of that holding device 40.

With continued reference to FIG. 8, the gas compressor within the integrated compressor/vacuum system 90 is operably connected to multiple gas conduits 145, which lead to each of the holding devices 40. If so desired, a single gas conduit (not shown) can alternatively be routed in series to each of the holding devices. In the illustrated embodiment, each gas conduit 145 is adjoined, via a connection housing 100 on one of the holding devices 40, to a coating channel 117 opening into the cavity 75 of that holding device 40. In the embodiment of FIG. 8, each gas conduit 145 opens into a coating reservoir 120, from which extends a coating channel 117. These reservoirs 120 are operably connected to the coating assembly 88 via coating supply conduits 155. A coating flow valve 125 system can be positioned within each coating reservoir 120 to control the retention and release of coating. The valves 125 can be of any conventional type that would allow entry of coating, via coating conduits 155, into the reservoirs 120 at the desired time and also release coating from the reservoirs 120 into the holding devices 40 via the coating channels 117 when desired. Although valves of this nature are not illustrated in the embodiments of FIGS. 6 and 7, those skilled in the art would of course appreciate the benefits of their use in such pneumatic systems.

Figure 9:
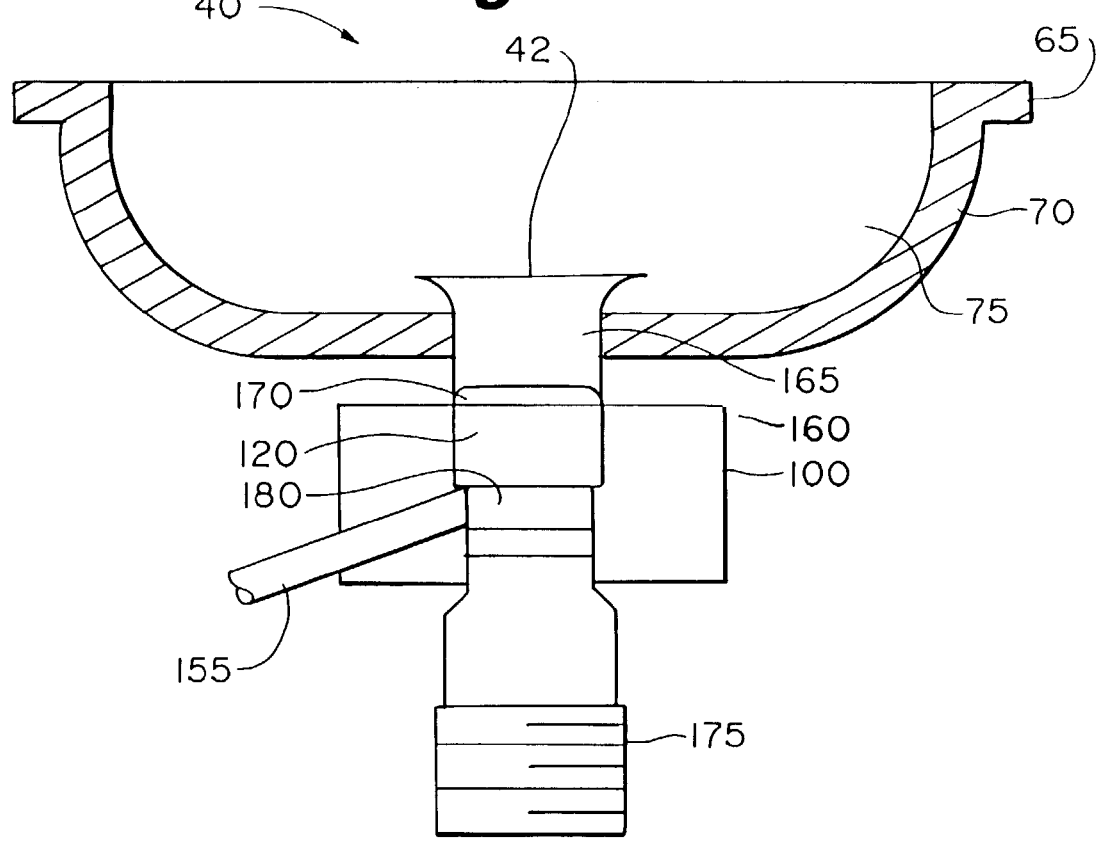
FIG. 9 is a sectional view of a holding device, which is operably coupled with a single channel pneumatic system in accordance with one embodiment of the invention.

FIG. 9 illustrates an embodiment of the present invention involving a single outlet to the cavity 75 of a holding device 40. This embodiment generally includes a spray passage 165, a coating reservoir 120, a coating conduit 155, and a pneumatic conduit 175. If so desired, the spray passage 165 can be provided with a conventional grid 42 at its outlet end to facilitate the dispersion of coating onto the surface of a workpiece (not shown). The spray passage 165 is adjoined to one end of the coating reservoir 120. The coating reservoir 120 optionally includes a coating release valve 170, which controls the release of coating into the spray conduit 165. The coating conduit 155 and the pneumatic conduit 175 are attached to the coating reservoir 120 through a reservoir valve 180. The reservoir valve 180 controls the release and retention of coating and gas into the reservoir 120 from the coating conduit 155 and the pneumatic conduit 175, respectively. The pneumatic conduit 175 can be operably connected to a compressor/vacuum assembly (not shown), as depicted in previously discussed embodiments, which provides both a vacuum source and a gas source. It is noted that the compressor/vacuum assembly can be controlled by an automated or computerized system (not shown). Such automated system could be adapted to control the emission of vacuum and gas by the compressor/vacuum assembly, as well as control the intensity of such emissions. It could also be adapted to control the reservoir valve 180, the coating release valve 170, and any other valves provided within the system.

Figure 10:
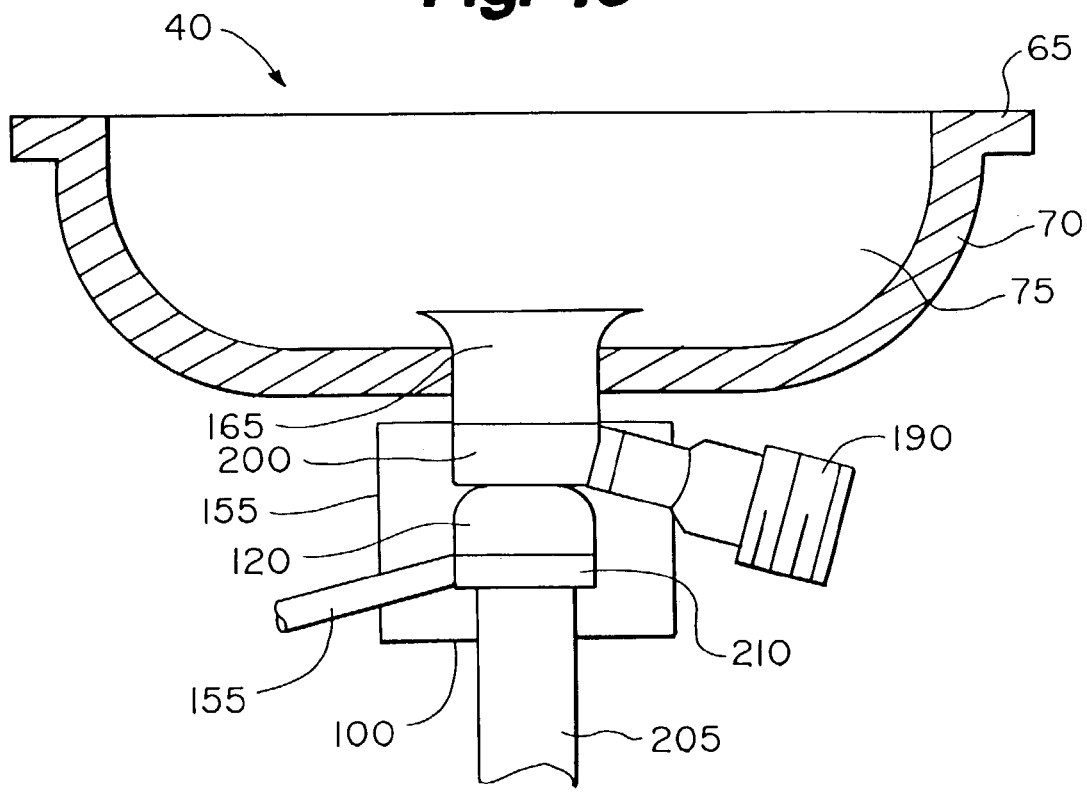
FIG. 10 is a sectional view of a holding device, which is operably coupled with a single channel pneumatic system in accordance with another embodiment of the invention.

FIG. 10 depicts another embodiment of the invention involving a single outlet to the cavity 75 of a holding device 40. A holding device 40 of this nature can be operably connected to a vacuum generator (not shown) that is separate from a gas compressor (not shown). The embodiment of FIG. 10 includes a spray passage 165, which is comparable to that depicted in FIG. 9 except that it is not provided with a spray grid. The spray passage 165 is adjoined to a vacuum passage 190 and a coating reservoir 120 through a first valve 200. Finally, the coating reservoir 120 is functionally connected to a coating conduit 155 and a gas conduit 205 through a second valve 210. Those skilled in the present art would readily appreciate that many other variations on the connection schemes illustrated in FIGS. 6–10 would be suitable for use with the present invention.

Referring back to FIG. 1, the pneumatic handling and recoating apparatus 10 of the invention can be employed to handle workpieces of various types and/or to move them from one location to another. In so doing, the pneumatic handling and recoating apparatus 10 is initially moved into a position adjacent to the workpiece to be handled. As presently contemplated, the invention is believed to be most valuable in handling glass sheets, although the invention is by no means limited to use with glass. As noted above, glass sheets are commonly stacked in a semi-upright position. When removing sheets from such a stack, the pneumatic handling and recoating apparatus 10 is moved into a position adjacent to a sheet at one end of the stack (i.e., an outermost sheet). Next, the base frame 35 is adjusted, by expansion or contraction, to position the holding devices 40 at desired locations to provide optimum handling of the workpiece (e.g., the outermost glass sheet). The base frame 35 is then moved toward the workpiece (e.g., toward the exposed major surface of the outermost glass sheet) until the holding devices 40 engage the workpiece, thereby defining a cavity 75 between each holding device 40 and the engaged surface of the workpiece. Next, a vacuum is drawn in each cavity 75 to sealingly attach the pneumatic devices 10 to the workpiece. The workpiece can then be lifted and/or moved to a desired location. When it is desired to release the workpiece for further processing, gas and coating material are expelled into the cavity 75 of each holding device 40 to detach the holding devices 40 and to apply or reapply coating to the workpiece.

As noted above, a single burst of gas and coating material can be employed to simultaneously detach the holding devices 40 and to apply coating to the workpiece. Alternatively, a delayed emission of coating can be provided, such that the coating is applied to the workpiece following detachment of the holding devices 40 from the workpiece. In such processes, detachment of the holding devices 40 preferably occurs just prior to emission of the coating. For example, a first burst of gas can be used to detach the holding devices 40 from the workpiece. Shortly thereafter, the coating material can be delivered to a coating reservoir 120 (or to an intersection point with each gas conduit) in each of the holding devices 40. Then, a second burst of gas can be emitted to expel the coating through the suction device 40 and onto the workpiece.

The present invention can be used to apply any desired coating to a workpiece during handling of the workpiece. The invention has particular utility in the handling of workpieces that carry an existing coating prior to handling, which coating is intended to remain on the workpiece following handling. As noted above, it is anticipated that the invention will be most valuable in the handling of glass sheets, such as are commonly used in automotive glazings (e.g., windshields) and architectural glazings (e.g., windows in residential or commercial buildings). As is well known in the art, glass sheets of this nature are commonly treated with protective materials, such as stain-retarding material and/or acidic buffers. For example, adipic acid and maleic acid have been used in various forms (e.g., powders and aqueous solutions). As noted above, these coatings are sometimes removed when the coated surface is handled by conventional pneumatic suction devices. This removal of coating can, however, be compensated for via the coating function provided by the pneumatic handling and recoating apparatus of the present invention.

Generally, it is preferable to recoat the surface of a handled workpiece with the same coating material as that applied to the workpiece (assuming a pre-coated workpiece) prior to handling. For example, when glass sheets coated with an adipic acid-based material are handled, it is typically preferable to set the present pneumatic handling and recoating apparatus to recoat the handled glass surfaces with another adipic acid-based agent. Of course, the glass (or other workpiece) can alternatively be coated with a material different than that which was originally applied to the workpiece. Moreover, it is to be understood that the present invention is not limited to use with workpieces that are coated prior to handling. Rather, the invention would be beneficial in any case where it is desirable to apply a coating to the surface of a workpiece during a handling operation.

While preferred embodiments of the present invention have been described, it should be understood that a variety of changes, adaptations, and modifications can be made therein without departing from the spirit of the invention and the scope of the appended claims.

What is claimed is:

1. A pneumatic handling and recoating apparatus comprising:
   a) a base frame carrying a plurality of suction devices, each suction device being adapted to engage a surface of a workpiece to define a cavity between the suction device and said surface of the workpiece;
   b) a vacuum assembly including a vacuum generator and at least one vacuum conduit operatively connecting the vacuum generator and the suction devices; and
   c) a gas assembly including a gas compressor and at least one gas conduit operatively connecting the gas compressor and the suction devices; and
   d) a coating assembly including a coating injector and at least one coating conduit operatively connecting the coating injector and the suction devices.

2. The pneumatic handling and recoating apparatus of claim 1 wherein each suction device includes a valve in communication with the gas assembly and the coating assembly, the valve being adapted to deliver gas and coating material respectively from the gas assembly and coating assembly into the cavity.

3. A pneumatic handling and recoating apparatus comprising:
   a) a plurality of suction devices each adapted to engage a surface of a workpiece to define a cavity between the suction device and said surface of the workpiece;
   b) a gas assembly operatively connected to the suction devices; and
   c) a coating assembly operatively connected to the suction devices; and
   d) a valve in each suction device in communication with the gas assembly and the coating assembly.

4. A pneumatic handling and recoating apparatus comprising:
   a) a holding device adapted to engage a surface of a workpiece to define a cavity between the holding device and said surface of the workpiece;
   b) a vacuum assembly operatively connected to the holding device and adapted to evacuate said cavity when the holding device is engaged with said surface of the workpiece;
   c) a gas assembly operatively connected to the holding device and adapted to expel a gas into the cavity; and
   d) a coating assembly operatively connected to the holding device and adapted to expel a coating material onto the surface of the workpiece defined by the boundaries of the holding device and areas thereabout,
wherein the gas assembly and coating assembly are adapted to expel a first burst of gas into the cavity to detach the holding device, and to expel a second burst of gas and coating material into the cavity to apply the coating material to the surface of the workpiece.

5. The pneumatic handling and recoating apparatus of claim 4 wherein the holding device further comprises spray means for dispersing coating material onto the surface of a workpiece.

6. The pneumatic handling and recoating apparatus of claim 5 wherein the spray means comprises a spray grid located within the cavity having spray apertures to disperse coating material onto the surface of a workpiece.

7. The pneumatic handling and recoating apparatus of claim 5 wherein the spray means comprises a spray passage located within the cavity to disperse coating material onto the surface of a workpiece.

8. A pneumatic handling and recoating apparatus comprising:
   a) a base frame carrying a plurality of holding devices, each holding device being adapted to engage a surface of a workpiece to define a cavity between the holding device and the surface of the workpiece;
   b) a vacuum assembly operatively coupled to the holding devices; and
   c) a gas assembly operatively coupled to the holding devices; and
   d) a coating assembly operatively coupled to the holding devices.

9. The pneumatic handling and recoating apparatus of claim 8 wherein each holding device includes a valve in communication with the gas assembly and the coating assembly, the valve being adapted to deliver gas and coating material from the gas assembly and coating assembly, respectively, to recoat the surface of the workpiece upon detachment of the holding device.

10. A pneumatic handling and recoating apparatus comprising:
    a) a plurality of holding devices each adapted to engage a surface of a workpiece to define a cavity between the holding device and the surface of the workpiece;
    b) a gas assembly operatively coupled to the holding devices; and
    c) a coating assembly operatively coupled to the holding devices; and
    d) a valve in each holding device in communication with the gas assembly and the coating assembly.

11. A pneumatic handling and recoating apparatus comprising:
    a) a holding device adapted to be engaged with a surface of a workpiece to define a cavity between the holding device and said surface of the workpiece, the cavity being substantially vacuous such that the holding device is sealingly attached to said surface of the workpiece;
    b) a gas assembly operatively connected to the holding device and adapted to expel a gas into the cavity; and
    c) a coating assembly operatively connected to the holding device and adapted to expel a coating material onto the surface of the workpiece defined by the boundaries of the holding device and areas thereabout,
wherein the gas assembly and coating assembly are adapted to expel a first burst of gas into the cavity to detach the holding device, and to expel a second burst of gas and coating material into the cavity to apply the coating material to the surface of the workpiece.

12. A pneumatic handling and recoating apparatus comprising:
    a) a holding device adapted to engage a surface of a workpiece to define a cavity between the holding device and said surface of the workpiece;
    b) a gas assembly operatively connected to the holding device;
    c) a coating assembly operatively connected to the holding device; and
    d) a valve in communication with the gas assembly and the coating assembly, the valve being adapted to deliver gas and coating material, respectively, from the gas assembly and the coating assembly to recoat the surface of the workpiece defined by the boundaries of the holding device and areas thereabout upon detachment of the holding device, wherein the gas assembly and coating assembly are adapted to expel a first burst of gas into the cavity to detach the holding device, and to expel a second burst of gas and coating material into the cavity to apply the coating material to the surface of the workpiece.

* * * * *